United States Patent
Matsumoto et al.

(10) Patent No.: US 6,898,993 B2
(45) Date of Patent: May 31, 2005

(54) TRANSMISSION FOR VEHICLE

(75) Inventors: Shinya Matsumoto, Saitama (JP);
Yoshiaki Tsukada, Saitama (JP);
Masaie Kato, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 10/352,931

(22) Filed: Jan. 29, 2003

(65) Prior Publication Data

US 2003/0213318 A1 Nov. 20, 2003

(30) Foreign Application Priority Data

Feb. 6, 2002 (JP) ....................................... 2002-029553

(51) Int. Cl.$^7$ ........................... F16H 59/00; F16H 3/08; F16D 19/00
(52) U.S. Cl. ...................... 74/371; 74/337.5; 192/93 C
(58) Field of Search ........................ 74/333–334, 337.5, 74/339, 355–356, 371, 372; 192/93 C, 46, 48.92

(56) References Cited

U.S. PATENT DOCUMENTS

| | | | | |
|---|---|---|---|---|
| 1,947,033 A | * | 2/1934 | Bush .......................... | 192/3.62 |
| 2,001,141 A | * | 5/1935 | Coom .......................... | 74/339 |
| 2,015,096 A | * | 9/1935 | Emil .......................... | 74/337 |
| 2,400,540 A | * | 5/1946 | Roland .......................... | 74/371 |
| 2,861,461 A | * | 11/1958 | Otto .......................... | 74/371 |
| 3,028,753 A | * | 4/1962 | Rudolf .......................... | 74/371 |
| 4,141,424 A | * | 2/1979 | Murayama et al. ........ | 180/53.2 |
| 4,301,690 A | * | 11/1981 | Cavenagh .................... | 74/363 |
| 5,086,896 A | * | 2/1992 | Murakami et al. ........ | 192/48.91 |
| 5,131,285 A | * | 7/1992 | Weismann et al. ............ | 74/333 |
| 5,445,044 A | * | 8/1995 | Lee .............................. | 74/372 |
| 5,570,608 A | * | 11/1996 | Miller .......................... | 74/325 |
| 5,975,266 A | * | 11/1999 | Balhorn ........................ | 192/64 |
| 6,427,547 B1 | * | 8/2002 | Bowen ......................... | 74/329 |
| 6,675,667 B1 | * | 1/2004 | Pelletier et al. ............... | 74/333 |
| 6,698,303 B2 | * | 3/2004 | Hoffmann et al. ......... | 74/337.5 |
| 2003/0131675 A1 | * | 7/2003 | Lipman | |

FOREIGN PATENT DOCUMENTS

| | | | | |
|---|---|---|---|---|
| FR | 2798177 | * | 3/2001 | ........... F16H/3/083 |
| JP | 09-249183 A | | 9/1997 | |

* cited by examiner

Primary Examiner—Tisha Lewis
(74) Attorney, Agent, or Firm—Birch, Stewart, Kolasch & Birch, LLP

(57) ABSTRACT

A transmission for a vehicle which can be applied to a shift mechanism where a shaft itself is rotated and having a simple configuration and axial miniaturization. A transmission for a vehicle in which a plurality of transmission shafts are provided each of which supports a plurality of transmission gears in a row and are arranged in parallel so that mutually corresponding transmission gears are engaged and transmission gears rotating in synchronization with the hollow shaft are selectively switched. Every transmission shaft is provided with a clutch mechanism provided between the hollow shaft and each transmission gear for fitting the hollow shaft and each transmission gear or releasing the fitting and a clutch actuator housed in the hollow shaft and the clutch mechanism selectively fits any transmission gear to the hollow shaft according to the axial position of the clutch actuator.

20 Claims, 11 Drawing Sheets

| SHIFT STAGE | FIRST TRANSMISSION SHAFT | | | THIRD TRANSMISSION SHAFT | | | FITTED POSITION OF CAM GUIDE | |
|---|---|---|---|---|---|---|---|---|
| | 632 | 633 | 634 | 672 | 673 | 674 | 638 | 678 |
| FIRST STAGE | × | × | O | O | × | × | 1 (M) | 1 (D) |
| SECOND STAGE | × | × | O | – | O | × | 2 (M) | 2 (D) |
| THIRD STAGE | × | O | – | O | × | × | 3 (M) | 3 (D) |
| FOURTH STAGE | × | O | – | – | O | × | 4 (M) | 4 (D) |
| FIFTH STAGE | O | – | – | – | O | × | 5 (M) | 5 (D) |
| SIXTH STAGE | × | O | – | – | – | O | 6 (M) | 6 (D) |
| SEVENTH STAGE | O | – | – | – | – | O | 7 (M) | 7 (D) |

O: ONE-WAY CLUTCH IS TURNED ON AND POWER IS TRANSMITTED
×: ONE-WAY CLUTCH IS TURNED OFF AND NO POWER IS TRANSMITTED
–: THROUGH ONE-WAY CLUTCH IS TURNED ON. NO POWER IS TRANSMITTED (FREE)

FIG.13

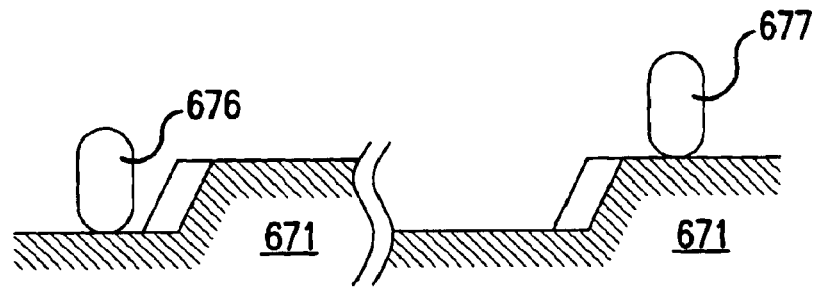

FIG.14(a)

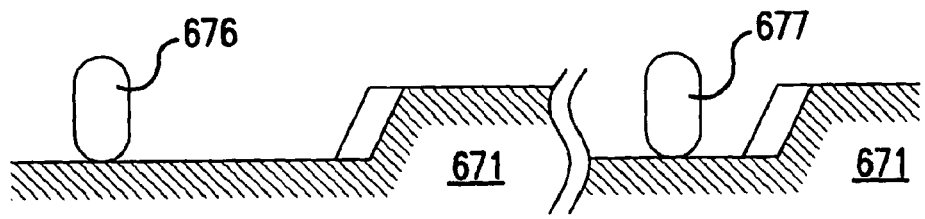

FIG.14(b)

TRANSMISSION FOR VEHICLE

CROSS-REFERENCE TO RELATED APPLICATIONS

The present nonprovisional application claims priority under 35 USC 119 to Japanese Patent Application No. 2002-029553 filed on Feb. 6, 2002 the entire contents thereof is hereby incorporated by reference.

BACKGROUND OF THE INVENTION

1. Field of the Invention

The present invention relates to a transmission for a vehicle, more particularly, to a constant-mesh type transmission for a vehicle in which plural transmission shafts each of which supports plural transmission gears in a row are arranged in parallel so that mutually corresponding transmission gears are engaged.

2. Description of Background Art

For a conventional type transmission for a bicycle, as disclosed in Japanese published unexamined patent application No. Hei9-249183, a planetary gear type transmission is provided with a hub spindle (a sun gear) fastened to a bicycle frame so that the hub spindle is not turned. A hub flange is attached to the periphery of the hub spindle so that the hub flange can be rotated. Plural gears (planetary gears) are provided between the hub spindle and the hub flange wherein pedal effort transmitted to a chain sprocket is varied at multiple stages by the plural planetary gears and each clutch mechanism and is transmitted to the hub flange is known. An actuator for fitting a ratchet one-way mechanism of the clutch mechanism or releasing the fitting is inserted into the hub spindle, and the fitting of the ratchet one-way mechanism and the release of the fitting are executed by revolving the actuator around the hub spindle by a predetermined angle.

The planetary gear type transmission is composed of multiple parts. Thus, the transmission efficiency is low and axial downsizing is particularly difficult because the multiple parts are axially arranged. Therefore, for a transmission for a bicycle the limit of the width is severe. Thus, the conventional type of transmission is not desirable.

In the prior art described above, as the actuator for fitting the ratchet one-way mechanism of the clutch mechanism or releasing the fitting is cylindrical and is required to be turned by a predetermined angle on the periphery of the spindle, it is difficult to apply the prior art to a transmission in which a spindle itself is rotated. Further, in the prior art, the actuator cannot be turned in a state in which torque is applied and the shift is disabled.

SUMMARY AND OBJECTS OF THE INVENTION

It is an object of the present invention to solve the problems of the prior art and to provide a transmission for a bicycle which can be applied to a shift mechanism in which a spindle itself is revolved, has a simple configuration and can be axially miniaturized.

To achieve this object, the present invention includes a transmission for a vehicle in which plural transmission shafts include hollow shafts wherein each hollow shaft supports plural transmission gears in a row that are arranged in parallel so that mutually corresponding transmission gears are engaged and a desired speed reducing ratio is acquired by selectively switching the transmission gear revolving in synchronization with the hollow shaft every transmission shaft.

(1) A clutch mechanism is provided between the hollow shaft and the transmission gear for synchronizing the hollow shaft and each transmission gear or releasing the synchronization. A clutch actuator is housed in the hollow shaft that is provided. The clutch mechanism selectively synchronizes each transmission gear with the hollow shaft or releases the synchronization according to an axial position of the clutch actuator.

(2) The clutch mechanism is provided with a pin member housed in an opening radially piercing the side wall of the hollow shaft so that the pin member can move vertically and a fitting member for fitting each transmission gear to the hollow shaft or releasing the fitting in interlock with the vertical motion of the pin member. The clutch actuator is in the shape of a rod and is provided with an irregular cam part arranged on its outside face according to a predetermined rule. The pin member is selectively made to vertically move by moving the clutch actuator in the hollow shaft and fitting the cam part to the bottom of the pin member.

(3) The cam part is circumferentially provided with an inclined face continuing from a cam groove to a cam crest.

According to the characteristic (1), as the clutch actuator can be housed in the hollow shaft, the constant-mesh type transmission which has a simple configuration and in which axial miniaturization is enabled can also be realized in a drive line in which a shaft itself is revolved.

According to the characteristic (2), the clutch mechanism can be realized by a simple configuration in the constant-mesh type transmission in which the clutch actuator is housed in the shaft.

According to the characteristic (3), as the pin member can be lifted from the cam groove to the cam crest by small force and smoothly, shift is enabled even if pedal effort is applied.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 13 shows the fitted position of each cam guide at each shift stage and correspondence among each transmission gear of the first and third transmission shafts with transmission gears mutually coupled; and FIGS. 14(a)–14(b) are explanatory drawings for explaining the operation of the third transmission shaft.

DETAILED DESCRIPTION OF THE PREFERRED EMBODIMENTS

Figure 1:
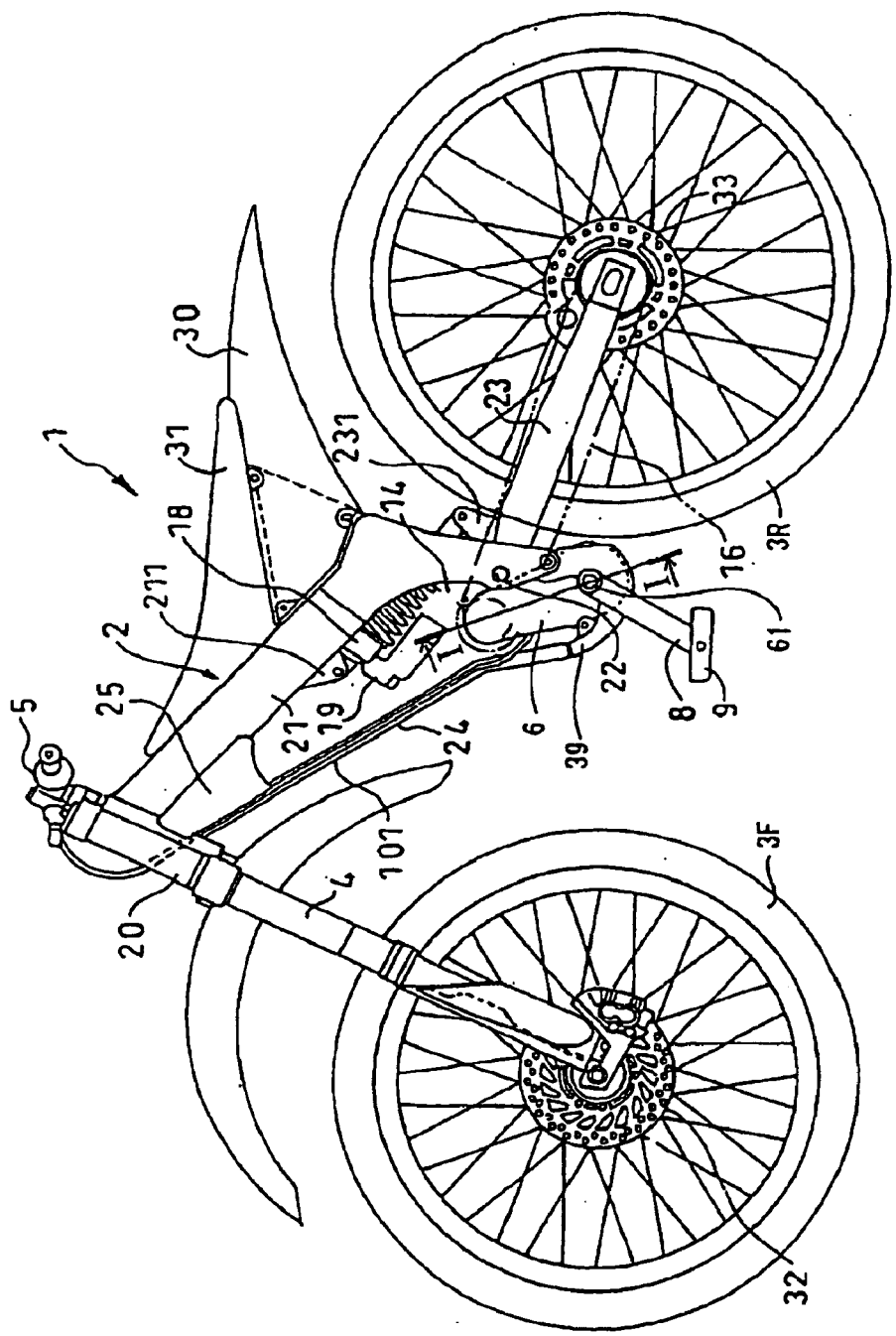
FIG. 1 is a side view showing a bicycle provided with a transmission equivalent to one embodiment of the present invention.

Referring to the drawings, preferred embodiments of the invention will be described in detail below. FIG. 1 is a side view showing a bicycle provided with a transmission equivalent to one embodiment of the invention.

A body frame 2 of a bicycle 1 is composed of a head pipe 20, a main frame 21 extending diagonally downwardly and rearwardly from the head pipe 20 forkedly right and left and a swing arm 23 supported by a reciprocating shaft 22 provided to the rear of the main frame 21 so that the swing arm can move vertically. A reinforcing pipe 24 is provided under the main frame 21. The reinforcing pipe 24 and the main frame 21 are coupled via a bracket 25 and a reinforcing member 39. The swing arm 23 may be a rear fork.

A rear wheel 3R is supported by the rear end of the swing arm 23. A front fork 4 is supported by the head pipe 20 so that the front fork 4 can steer the bicycle 1. The front fork 4 is an inverted type in which an outer tube and an inner tube are combined and the outer tube is located over the inner tube. A steering handlebar 5 is provided above the front fork 4 and a front wheel 3F is supported by a lower part of the front fork.

The main frame 21 and the reinforcing pipe 24 are coupled in respective lower parts via the coupling member 39. A pedal effort transmission device 6 is supported by the coupling member 39. The pedal effort transmission device 6 includes a transmission that transmits the revolution of a crankshaft 61 to the rear wheel 3R. A pedal 9 is attached to the crankshaft 61 via a crank 8. A pair of right and left cranks 8 and pedals 9 are provided to the crankshaft 61.

A bracket 231 is provided to the swing arm 23, a bracket 211 is provided to the main frame 21 and a cushion member 18 for relieving shock when the swing arm 23 is turned upwardly is provided between the brackets 231 and 211. Working fluid is supplied from a reservoir tank 19 to the cushion member 18.

A rear fender 30 is attached to the main frame 21 and a seat 31 is mounted on the rear fender 30 and the main frame 21. The rear fender 30 can be made of light material such as carbon fibers. Disc brakes 32, 33 are provided to the front wheel 3F and the rear wheel 3R. A transmission operating cable 101 extends from a speed change lever not shown and is mounted on the steering handlebar 5 and extends to the pedal effort transmission device 6 along the reinforcing pipe 24.

Figure 2:
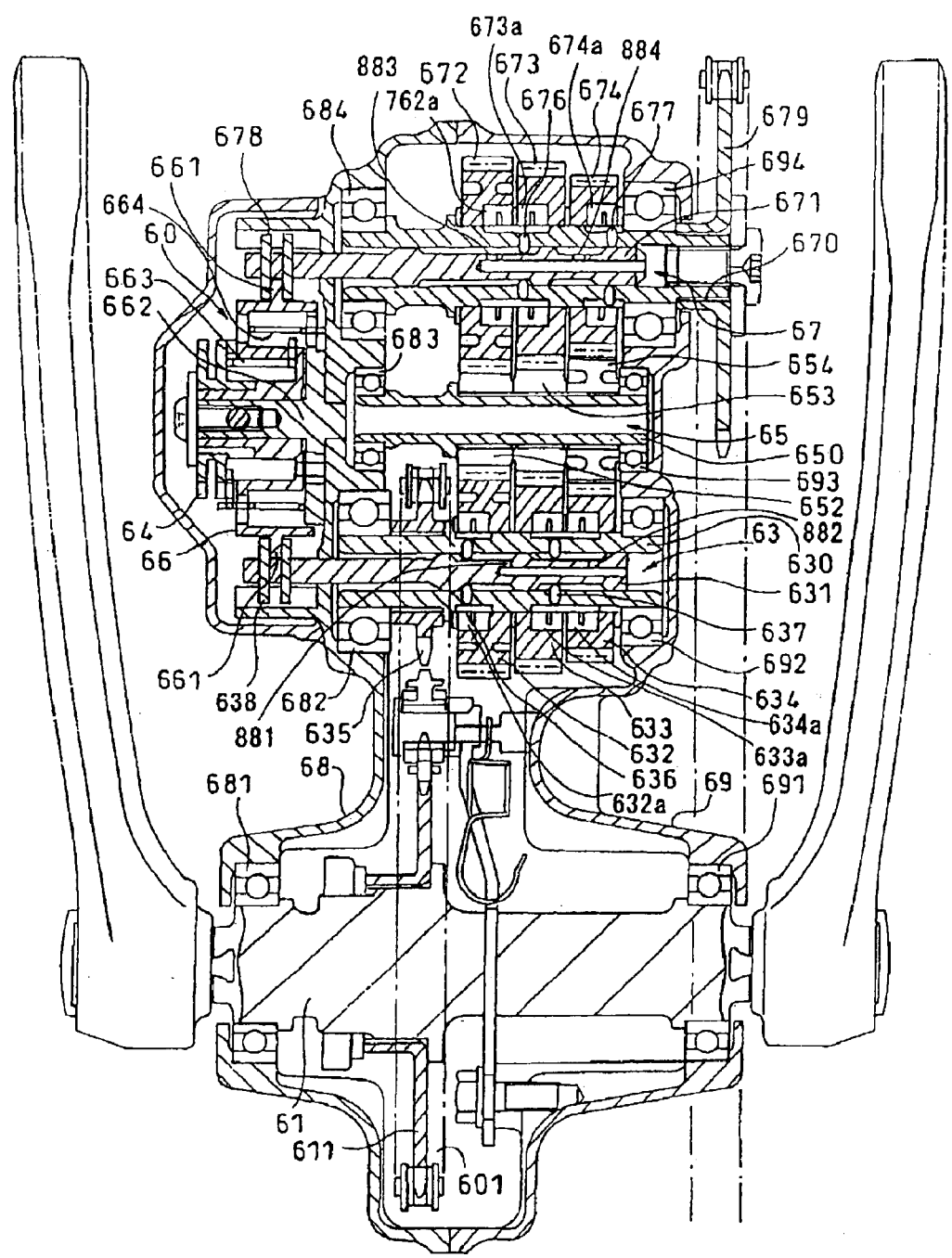
FIG. 2 is a sectional view viewed along a line I—I showing the pedal effort transmission shown in FIG. 1.

FIG. 2 is a sectional view showing the pedal effort transmission device 6 viewed along a line I—I in FIG. 1, the pedal effort transmission device is mainly composed of a constant-mesh type transmission 60 and the crankshaft 61 and the transmission 60 is composed of transmission shafts 63, 65, 67 which are arranged in parallel wherein each of which supports plural transmission gears in a row.

Both ends of the crankshaft 61 are supported by ball bearings 681, 691 so that the crankshaft can be turned. The respective outer races of the ball bearings 681, 691 are press-fitted into a right case half 68 and a left case half 69. A pedal sprocket 611 coaxially pierces the substantial center of the crankshaft 61.

In the transmission 60, the first transmission shaft 63 includes a hollow rotation shaft 630 with a rod-shaped clutch actuator 631 which supports the hollow shaft 630 so that the hollow shaft can be turned and which is supported so that the clutch actuator cannot be turned. Transmission gears 632, 633, 634 are supported by the hollow shaft 630 via each clutch mechanism (each ratchet one-way mechanism in this embodiment) 632a, 633a, 634a. A driven sprocket 635 is fixedly inserted into the hollow shaft 630 with pin members 636, 637 which pierce the side wall of the hollow shaft 630 and which are supported so that the pin members can move vertically. A cam guide 638 is provided to one end of the clutch actuator 631.

Both ends of the hollow shaft 630 are supported by ball bearings 682, 692 so that the hollow shaft can be turned. The respective outer races of the ball bearings 682, 692 are press-fitted into the right case half 68 and the left case half 69. The driven sprocket 635 of the first transmission shaft 63 and the pedal sprocket 611 of the crankshaft 61 are coupled via a chain 601 without an end.

Passages 881, 882 are provided to the clutch actuator 631 and a concave portion on the outside face of the clutch actuator 631 communicates with the outside via each passage. As a result, as a problem with the variation of internal pressure is solved, a variation of the volume of the concave portion on the outside face by the vertical motion of the pin members 636, 637, a satisfactory shift field is acquired.

The second transmission shaft 65 of the transmission 60 is mainly composed of a cylindrical hollow shaft 650 and transmission gears 652, 653, 654 fixedly supported by the periphery of the hollow shaft 650. Both ends of the hollow shaft 650 are supported by ball bearings 683, 693 so that the hollow shaft can be turned. The respective outer races of the ball bearings 683, 693 are press-fitted into the right case half 68 and the left case half 69.

The third transmission shaft (the output shaft) 67 of the transmission 60 includes a hollow shaft 670 with a rod-shaped clutch actuator 671 which supports the hollow shaft 670 so that the hollow shaft can be turned and which is supported so that the clutch actuator cannot be turned. Transmission gears 672, 673, 674 are supported by the hollow shaft 670 via each ratchet one-way mechanism 672a, 673a, 674a. Pin members 676, 677 pierce the side wall of the hollow shaft 670 and are supported so that the pin members can move vertically. A cam guide 678 is provided to one end of the clutch actuator 671 and a driving sprocket 679 coupled to the other end of the hollow shaft 670.

Both ends of the hollow shaft 670 are supported by ball bearings 684, 694 so that the hollow shaft can be turned. The respective outer races of the ball bearings 684, 694 are press-fitted into the right case half 68 and the left case half 69. Passages 883, 884 are provided to the clutch actuator 671.

A control face 661 is provided along the outside face of a shift plate 66 and is fitted to each cam guide 638, 678 of the first and third transmission shafts 63, 67. The shift plate 66 is supported by a rotation shaft 662 fixedly arranged on an extended line of the hollow shaft 650 so that the shift plate can be turned. A cable hanger 64 for fitting a nipple of the transmission operating cable 101 is inserted into the end of the shift plate 66. The shift plate 66 is constantly pressed on the side (in a shift up direction) reverse to a direction in which the operating cable is turned (a shift down direction) by a return spring 664 one end of which is fitted to a flange of the rotation shaft 662. The other end of a lost motion spring 663 one end of which is fitted to the shift plate 66 is fitted to the cable hanger 64.

The lost motion spring 663 enables a lost motion of the shift plate 66 when the cable hanger 64 is turned in the shift down direction. The return spring 664 enables a lost motion of the shift plate 66 when the cable hanger 64 is turned in the shift up direction.

Figure 3A:
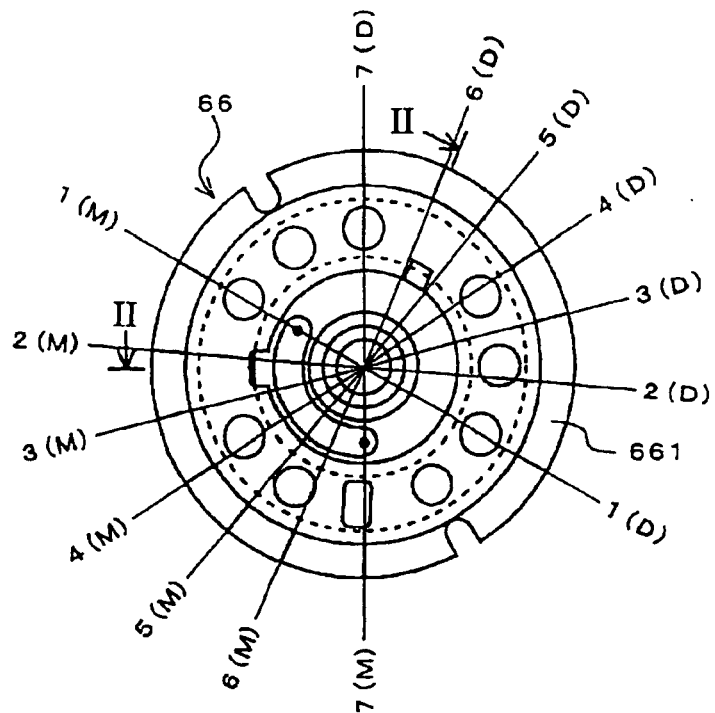
FIGS. 3(a)–3(c) show the configuration of a shift plate 66.
Figure 3B:
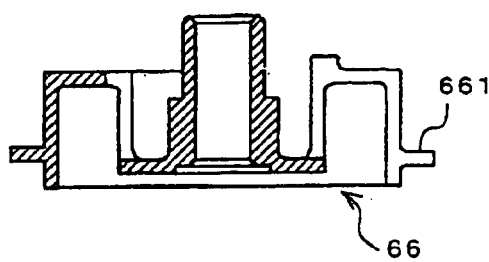

FIGS. 3(*a*)–3(*c*) show the structure of the shift plate 66. FIG. 3(*a*) is a front view, FIG. 3(*b*) is a sectional view viewed along a line B—B in FIG. 3(*a*) and FIG. 3(*c*) is an expansion plan showing a control face 661 provided on its outside face in a circumferential direction.

Figure 3C:
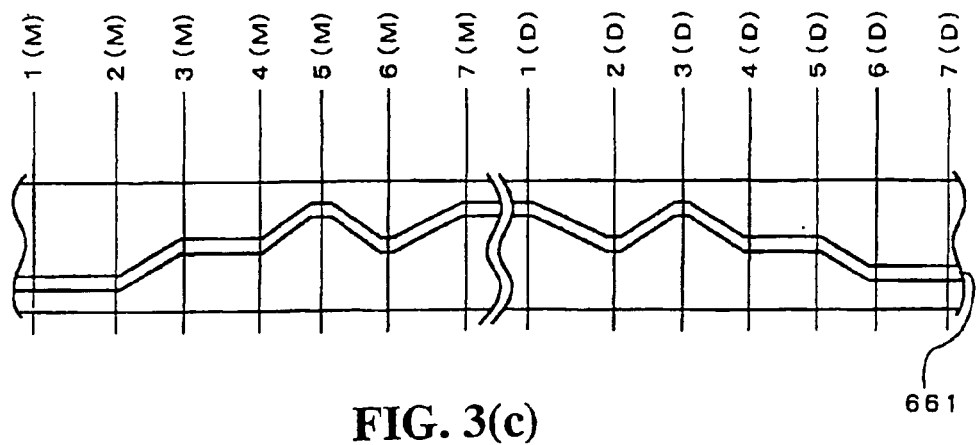

The axial position of the control face 661 is different depending upon positions 1 (M) to 7 (M) and 1 (D) to 7 (D) as shown in FIG. 3C. The positions 1 (M) to 7 (M) are fitted to the cam guide 638 of the first transmission shaft 63 and the positions 1 (D) to 7 (D) are fitted to the cam guide 678 of the third transmission shaft 67. For the number of shifts, if each cam guide 638, 678 is fitted to 1 (M), 1 (D), the number of shifts is one, if each cam guide is fitted to 2 (M), 2 (D), the number is two and if each cam guide is fitted to 7 (M), 7 (D), the number is seven.

Figures 4A, 4B:
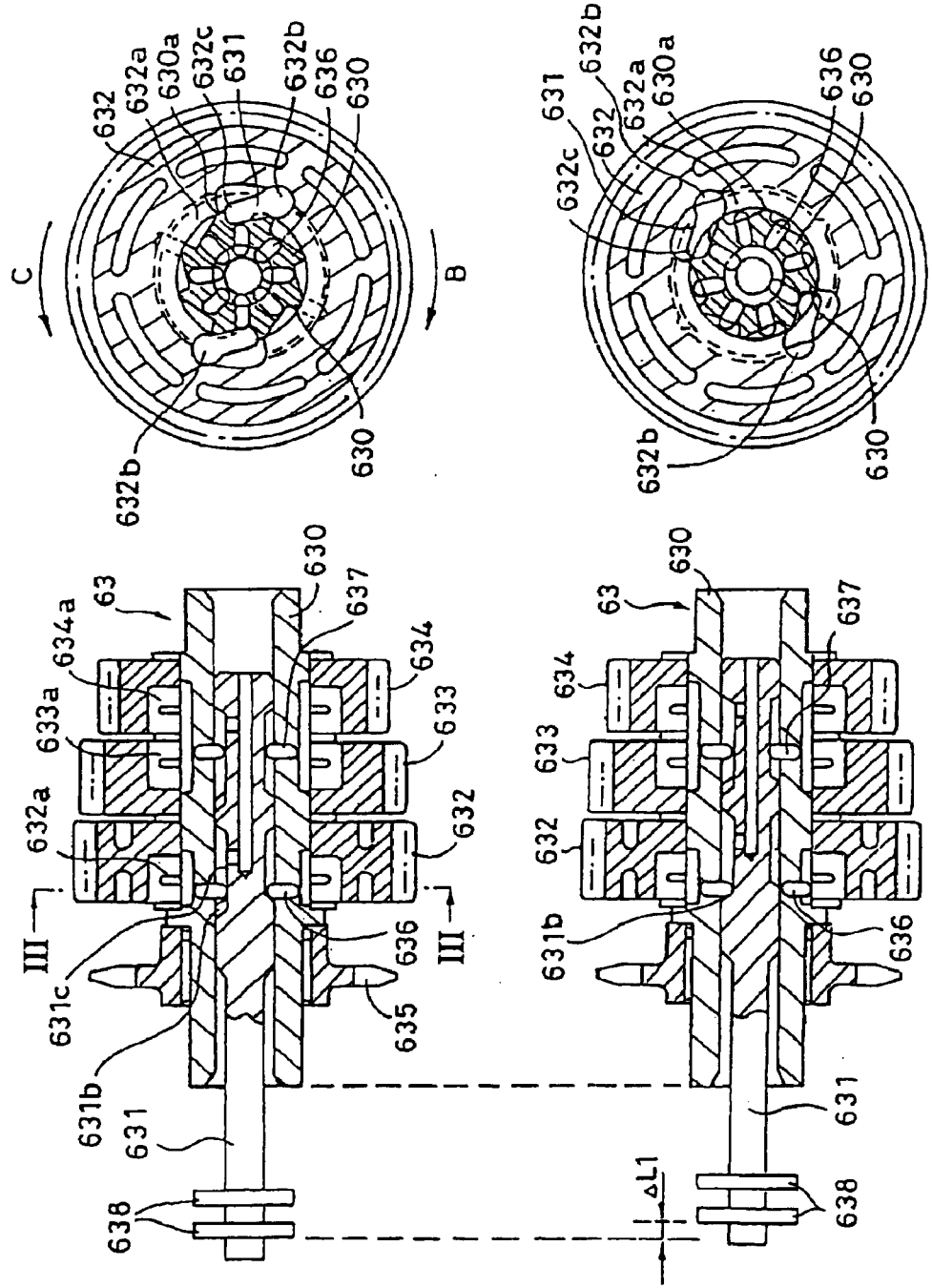
FIGS. 4(a) and 4(b) show the operation of a transmission shaft (1)

FIGS. 4(*a*)–4(*b*) and 5(*a*)–5(*b*) are side views viewed along the transmission shaft and sectional views viewed along a line I—I for explaining the clutch mechanisms of the first transmission shaft 63 and the third transmission shaft 67. The same reference number denotes the same or the similar part.

The operation in the case of shift down from a fifth stage (the state shown in FIG. 2) to a fourth stage and operation in the case of shift up to a sixth stage will be described based upon the first transmission shaft 63 below.

Figure 6A:
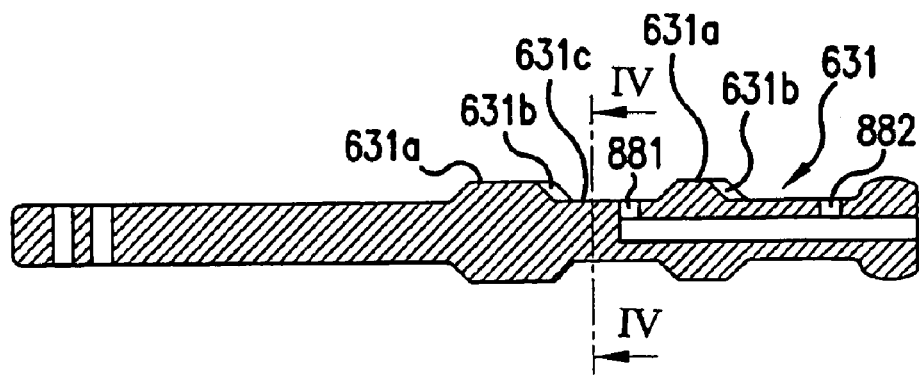
FIGS. 6(a) and 6(b) show the configuration of a clutch actuator.
Figure 6B:
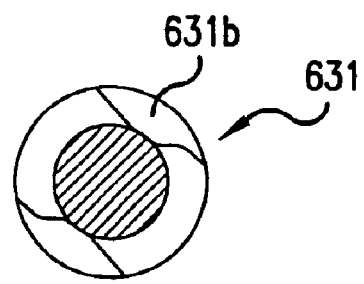

As shown in FIGS. 6(*a*)–6(*b*) in detail, wherein FIG. 6(*b*) is a cross-section along the line IV—IV in FIG. 6(*a*), a cam part in which a cam crest 631*a* and a cam groove 631*c* continue is formed on the outside face of the clutch actuator 631. An inclined face 631*b* connecting the cam crest 631*a* and the cam groove 631*c* is formed in a boundary between the cam crest and the cam groove in a circumferential direction.

When the number of shifts is five, the cam guide 638 of the first transmission shaft 63 is fitted to the position 5 (M) shown in FIG. 3C, the cam guide 678 of the third transmission shaft 67 is fitted to the position 5 (D) and as a result, as described in detail later, the first transmission gear 632 of the first transmission shaft 63 and the second gear 673 of the third transmission shaft are coupled via the second transmission shaft.

FIG. 13 shows the fitted position of each cam guide 638, 678 at each shift stage 1 to 7 and the correspondence of each transmission gear of the mutually coupled first and third transmission shafts 63 and 67 via the second transmission shaft 65, for example, at a second stage except the fifth stage. The cam guide 638 of the first transmission shaft 63 is fitted to the position 2 (M) of the control face 661 and the cam guide 678 of the third transmission shaft 67 is fitted to the position 2 (D). As a result, the third gear 634 of the first transmission shaft 63 is coupled to the second transmission gear 673 of the third transmission shaft 67 via the second transmission shaft 65.

As the pin members 636 and 637 are both located in the cam groove 631*c* of the clutch actuator 631 in the first transmission shaft 63 as shown in FIG. 4(*a*) when the number of shifts is five as shown in FIG. 2, the free ends 632*c* of a pair of ratchet pawls 632*b* are rocked in a central direction for the first transmission gear 632 as shown in FIG. 4(*b*) and are fitted to gear teeth 630*a* provided on the outside face of the hollow shaft 630 in a direction of normal rotation. Similarly, the second and third transmission gears 633 and 634 are also engaged with the gear teeth 630*a* of the hollow shaft 630 in the direction of normal rotation. Therefore, if the hollow shaft 630 is revolved in a direction shown by an arrow B according to pedal effort input to the driven sprocket 635, all the transmission gears 632, 633 and 634 are revolved in the direction shown by the arrow B in synchronization with it.

However, as the second transmission shaft 65 is turned at the highest speed by a driving force transmitted from the first transmission gear 632 of the first transmission shaft 63 to the first transmission gear 652 of the second transmission shaft, only the driving force transmitted from the first transmission gear 632 of the first transmission shaft 63 acts upon the second transmission shaft 65 as also shown in FIG. 13, and the second and third transmission gears 633 and 634 are substantially raced by their clutch mechanisms.

At this time, as the pin member 676 is located in the cam groove of the clutch actuator 671 and the pin member 677 is located on the cam crest of the clutch actuator 671 in the third transmission shaft 67 as shown in FIG. 14(*a*), only the ratchet one-way mechanisms 672*a* and 673*a* of the first and second transmission gears 672 and 673 are turned on and are fitted to the hollow shaft 670 in the direction of normal rotation. However, as the second transmission gear 673 has a smaller diameter and the first transmission gear 672 becomes free, pedal effort input to the sprocket 635 is transmitted to the driving sprocket 679 via the first transmission gear 632 of the first transmission shaft 63, the second transmission shaft 65 and the second transmission gear 673 of the third transmission shaft 67.

As a shift operation cable 101 is pulled out when a rider executes shift down operation to the fourth stage, working the pedal, the shift plate 66 is turned against the elastic force of the return spring 664. By the shift operation, the clutch actuator 631 of the first transmission shaft 63 is axially displaced by a cam mechanism composed of the control face 661 and the cam guide 638. When the clutch actuator 631 is displaced by distance ΔL1 as shown in FIG. 4(*b*), the pin member 636 reaches an entrance of the inclined face 631*b* of the clutch actuator 631 and further, starts to advance on the inclined face 631*b* as the hollow shaft 630 is turned.

In case when the rider swiftly makes a shift operation and frequently makes a shift operation or in case when the revolution speed of the crankshaft is small as in a case that the bicycle goes up on a slope and the axial traveling speed of the clutch actuator 631 for the hollow shaft 630 is limited, the revolution speed of the shift plate 66 cannot follow the revolution speed of the cable hanger 64 and elastic force according to phase difference between both is stored in the lost motion spring 663.

Figure 5A:
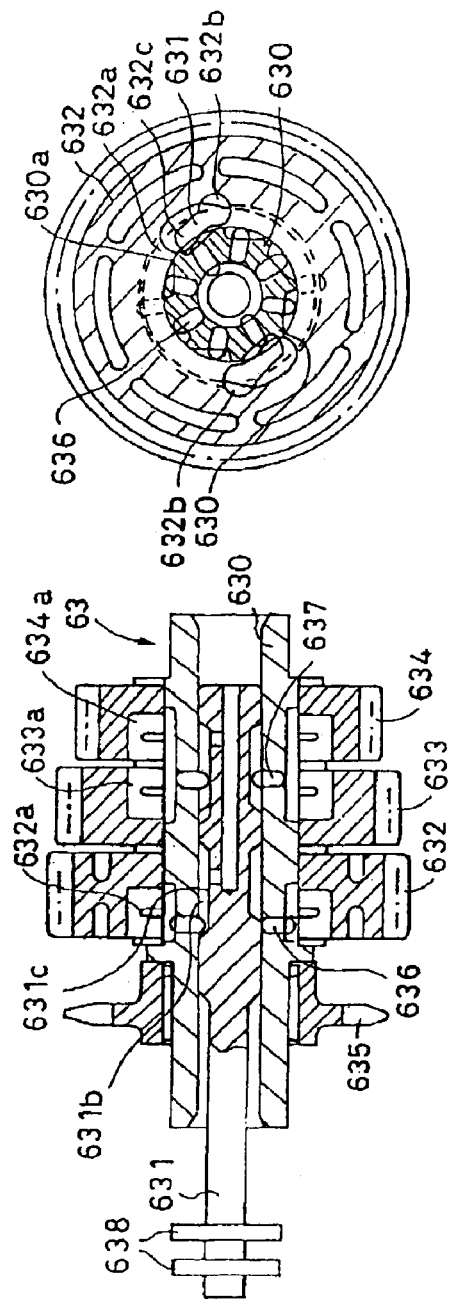
FIGS. 5(a) and 5(b) show the operation of the transmission shaft (2)
Figure 5B:
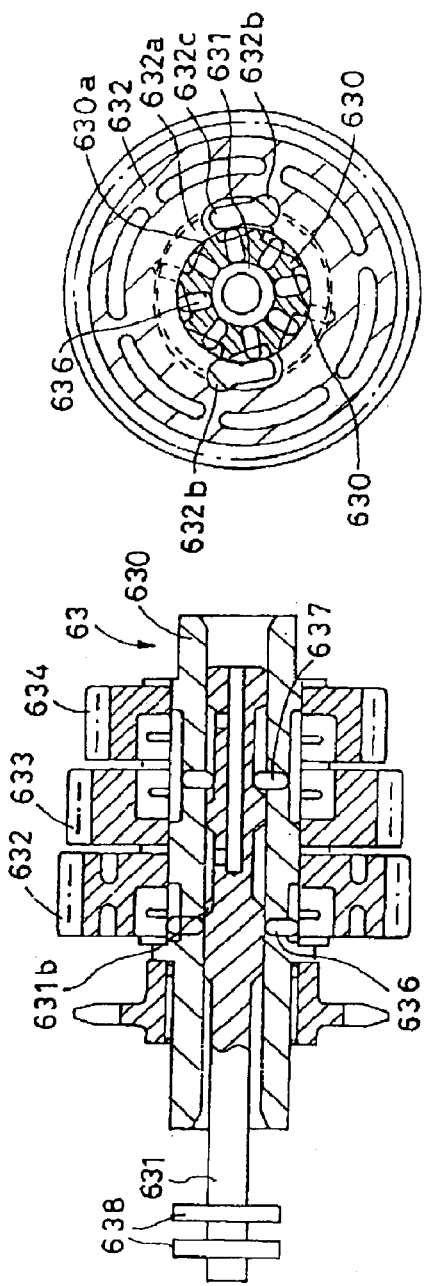

Afterward, the pin member 636 starts to go up on the inclined face 631*b* by interaction between the elastic force stored in the lost motion spring 663 and the inclined face 631*b* as shown in FIG. 5(*a*) if pedal effort is input and when the pin member 636 further advances, it climbs on the cam crest 631*a* of the clutch actuator 631 as shown in FIG. 5(*b*). As a result, as the free end 632*c* of the ratchet pawl 632*b* is radially pushed up by the pin member 636, the fitting between the first transmission gear 632 and the hollow shaft 630 is released and only the transmission gears 633 and 634 can maintain the fitting to the hollow shaft 630.

At this time, the third transmission shaft 67 is also displaced by ΔL1 and the cam guide 678 is fitted to the position 4 (D) of the control face 661. However, as the position 4 (D) is the same as the position 5 (D), the engagement of the third transmission shaft 67 is unchanged. As a result, as the diameter of the second transmission gear 673 is smaller than that of the first transmission gear 672 though the respective clutch mechanisms of the first and second transmission gears 672 and 673 are turned on and the clutch mechanism of the third transmission gear is turned off in the third transmission shaft 67, the first transmission gear 672 becomes free. Therefore, pedal effort input to the sprocket 635 is transmitted to the driving sprocket 679 via the second transmission gear 633 of the first transmission shaft 63, the second transmission shaft 65 and the second transmission gear 673 of the third transmission shaft 67.

In the meantime, as the shift operation cable 101 is pulled in by the elastic force of the return spring 664 when the rider executes a shift up operation to a sixth stage, the shift plate 66 is turned in a direction reverse to the direction in shift down. The clutch actuator 631 of the first transmission shaft 63 is axially displaced by the cam mechanism composed of the control face 661 and the can guide 638 according to the shift operation and the cam guide 638 is fitted to the position 6 (M) of the control face 661.

In this embodiment, as shown in FIG. 3(*c*), as the position 6 (M) and the position 4 (M) of the control face 661 are the same, the clutch actuator 631 and the pin members 636, 637 are operated as in the shift down to the fourth stage.

As elastic force according to phase difference between both is stored in the return spring 646 in this embodiment when the revolution speed of the shift plate 66 cannot follow the revolution speed of the cable hanger 64 because the operation is swiftly executed in shift up, a lost motion of the shift plate 66 is enabled as described above.

As the pin member 677 also drops in the cam groove of the clutch actuator 671 in the third transmission shaft 67 as shown in FIG. 14(*b*), the ratchet one-way mechanisms 672*a*, 673*a* and 674*a* of all the transmission gears 672, 673 and 674 are turned on. However, as the diameter of the third transmission gear 674 is the smallest in the third transmission shaft 67, the other transmission gears 672 and 673 become free. Therefore, pedal effort input to the sprocket 635 is transmitted to the driving sprocket 679 via the second transmission gear 633 of the first transmission shaft 63, the second transmission shaft 65 and the third transmission gear 674 of the third transmission shaft 67 as also shown in FIG. 13.

As described above, according to this embodiment, as the clutch actuator 631 can be housed in the hollow shaft 630, the constant-mesh type transmission the axial miniaturization of which is enabled by the simple configuration can be also realized in a drive line in which a shaft itself is revolved.

Also, in this embodiment, as the inclined face 631*b* connecting the cam groove 631*c* and the cam crest 631*a* is circumferentially provided to the irregular cam part formed on the outside face of the clutch actuator 631 and the pin member can be carried from the cam groove 631*c* to the cam crest 631*a* by a small force and smoothly, speed can be changed even if pedal effort is applied to the crankshaft.

Further, according to this embodiment, as a shift operation is held in the lost motion spring 663 (in shift down) or the return spring 646 (in shift up) as elastic force in case a shift mechanism cannot follow the shift operation and afterward, the shift mechanism executes shift by the elastic force, secure shift is enabled even if shift operation is swiftly made, shift operation is made a plurality of times or shift operation is made in a low-speed operation. Therefore, a condition related to shift timing is relaxed and a shift degree of freedom is high is enabled.

Figure 7:
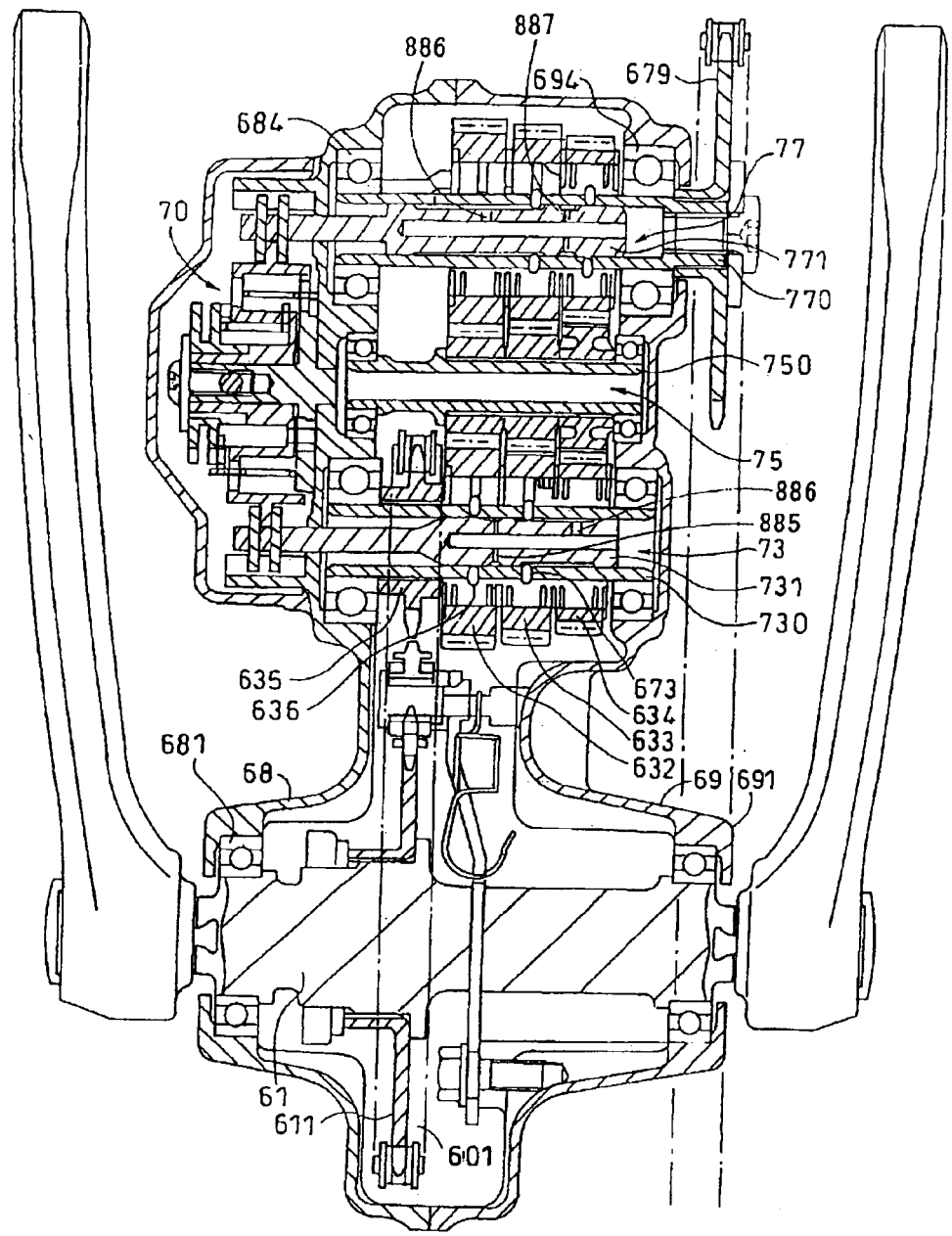
FIG. 7 is a sectional view showing another embodiment of the pedal effort transmission shown in FIG. 1.

FIG. 7 is a sectional view showing a second embodiment of the pedal effort transmission and the same reference number denotes the same or the similar part.

In the first embodiment, the case in which the ratchet one-way mechanism is adopted for the clutch mechanism for fitting the clutch actuators 631 and 671 of the first and third transmission shafts 63 and 67 and each transmission gear or releasing the fitting is described. However, in this embodiment a roller one-way mechanism is adopted in place of the ratchet one-way mechanism. FIG. 7 shows a state of four stages.

In a transmission 70, a first transmission shaft 73 is mainly composed of a cylindrical hollow shaft 730, a rod-shaped clutch actuator 731 inserted into the hollow shaft 730, transmission gears 632, 633, 634 supported by the hollow shaft 730 via a roller one-way mechanism as a clutch mechanism, a sprocket 635 fixedly inserted into the hollow shaft 730, pin members 636, 637 piercing the side wall of the hollow shaft 730 and supported so that the pin member can move vertically and a cam guide 638 provided to one end of the clutch actuator 731.

Both ends of the hollow shaft 730 are supported by ball bearings 682, 692 so that the hollow shaft can be turned. The outer race of each ball bearing 682, 692 is press-fitted into a right case half 68 and a left case half 69. The sprocket 635 of the first transmission shaft 73 and a pedal sprocket 611 of a crankshaft 61 are coupled by a chain 601 without an end. Passages 885, 886 are provided to the clutch actuator 731.

A second transmission shaft 75 of the transmission 70 is provided with a similar configuration to the second transmission shaft 65 in the first embodiment. A third transmission shaft 77 of the transmission 70 is also provided with a similar configuration to the third transmission shaft 67 in the first embodiment except that its clutch mechanism is a roller one-way mechanism and a rod-shaped clutch actuator 771 is inserted into a hollow shaft 770. Passages 886, 887 are provided to the clutch actuator 771.

Figure 8A:
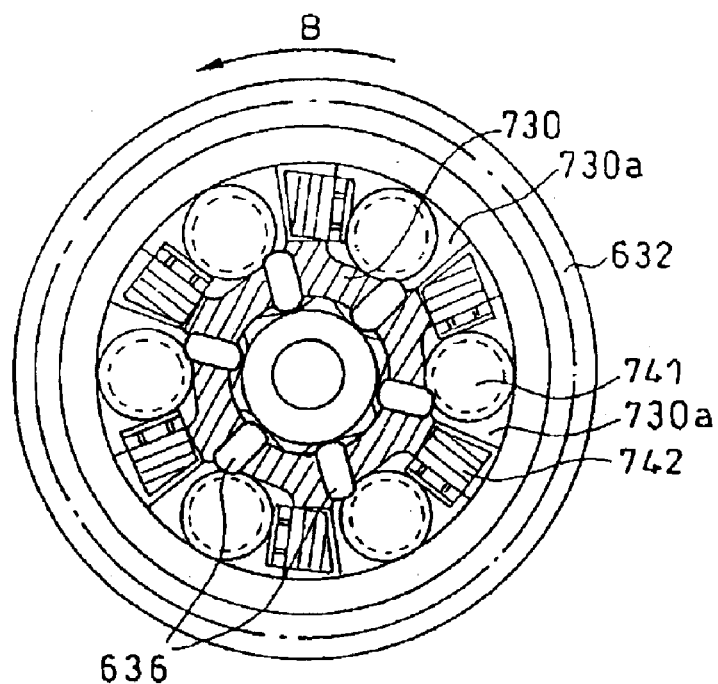
FIGS. 8(a) and 8(b) are sectional views showing a roller one-way mechanism.
Figure 8B:
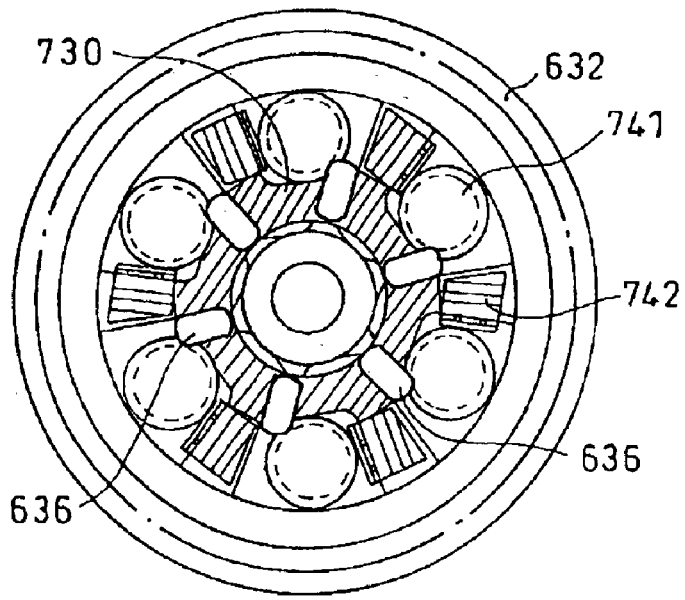
Figure 9A:
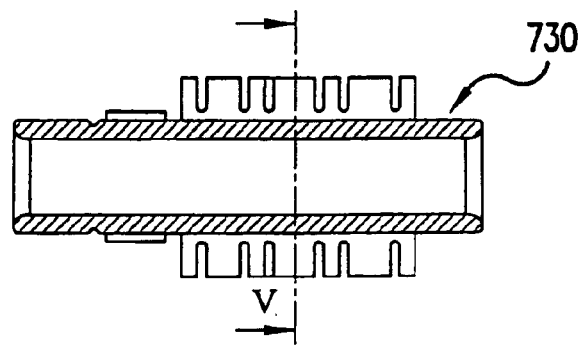
FIGS. 9(a) and 9(b) are sectional views showing a hollow shaft.
Figure 9B:
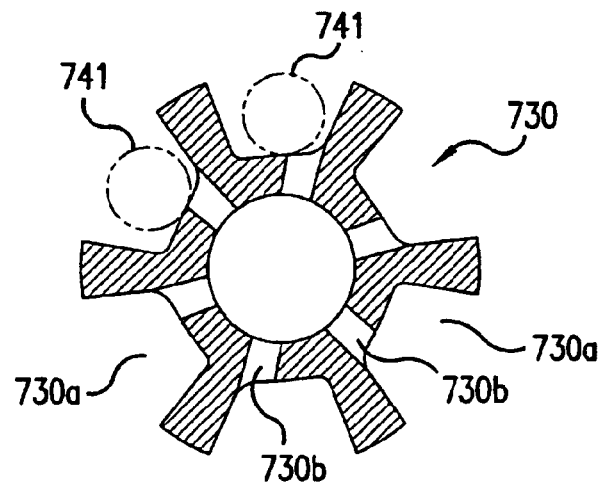

FIGS. 8(*a*) and 8(*b*) are sectional views showing the structure of the roller one-way mechanism, FIG. 9(*a*) is a sectional view viewed along the axis of the hollow shaft 730, FIG. 9(*b*) is a sectional view viewed along a line V—V in FIG. 9(*a*) and the same reference number denotes the same or the similar part.

As shown in FIG. 9(*b*), the hollow shaft 730 is provided with six slits 730*a* at an equal interval in an axial direction of the outside face and an opening 730*b* linked with a central hole is formed on the side of one end of the bottom of each slit 730*a*. The side of one end on which the opening 730*b* is formed of the bottom of the slit 730*a* is shallower than the side of the other end.

Figure 10:
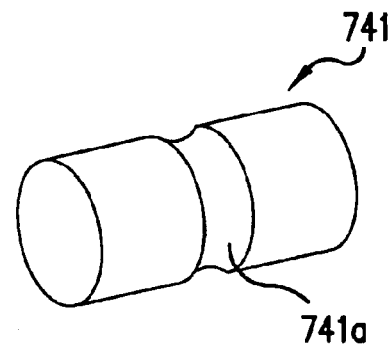
FIG. 10 is a perspective view showing a roller of the roller one-way mechanism.

As shown in FIGS. 8(*a*) and 8(*b*), in each slit 730*a* of the hollow shaft 730, plural (three in this embodiment) rollers 741 are housed axially in a line and a pin member 676 is housed in each opening 730*b* so that the pin member can move vertically. As shown in FIG. 10, an annular groove 741*a* is formed on the circumference in the center of the roller 741. A rock spring 742 that elastically presses the roller 741 on the side of the other side wall in the slit is inserted into one of the opposite side walls of each slit 730*a*.

Figure 11:
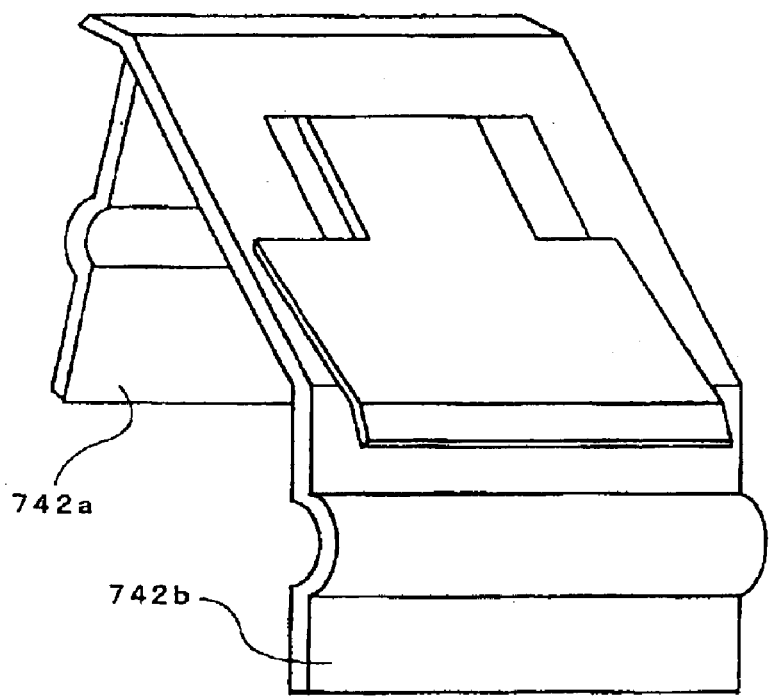
FIG. 11 is a perspective view showing a rock spring of the roller one-way mechanism.
Figure 12:
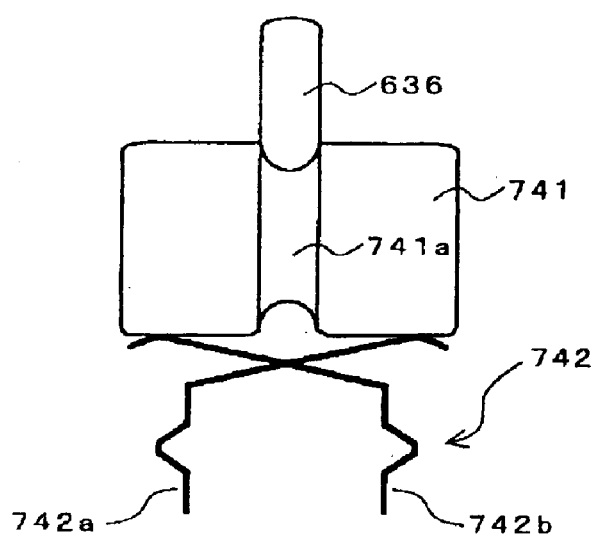
FIG. 12 shows the configuration of a main part of the roller one-way mechanism.

FIG. 11 is a perspective view showing the configuration of the rock spring 742 and in this embodiment, a plane part acquired by fitting respective one principal planes of a pair of L-type springs 742*a*, 742*b* and legs which are respective other principal planes of a pair of L-type springs and support the plane part by each one end and each other end are included. FIG. 12 shows the relative positional relation of the rock spring 742, the roller 741 and the pin member 636 respectively viewed from another angle.

In such a configuration, the pin member 636 vertically moves according to an axial position of the clutch actuator 731 as described above, in a state in which the pin member 636 is lowered. Each roller 741 is elastically pressed from a deep position to a shallow position in each slit 730*a* by each rock spring 742 clockwise as shown in FIG. 8(*a*). Therefore, as the outside face of the hollow shaft 730 and the inside face of the transmission gear 632 are fitted via the roller 741, the transmission gear 632 is also revolved in a direction shown by an arrow B in synchronization when the hollow shaft 730 is revolved in the direction shown by the arrow B according to pedal effort input to the driven sprocket 635.

In the meantime, in a state in which the pin member 636 is lifted, each roller 741 is pushed back counterclockwise against the resilience of each rock spring 742 by the pin member 636 as shown in FIG. 8(*b*) and is moved from the shallow position to the deep position in each slit of the hollow shaft 730. As a result, as the fitting of the hollow shaft 730 and the transmission gear 632 via the roller 741 is released, the transmission gear 632 is not revolved even if the hollow shaft 730 is revolved in the direction shown by the arrow B according to pedal effort input to the driven sprocket 635.

According to this embodiment, as not only the similar effect to that in the first embodiment is acquired but the lash is smaller in roller on-way structure, compared with that in the ratchet one-way structure, shock and a lash at a pedal when speed is changed, inputting pedal effort can be greatly reduced.

According to the invention, the following effect is acquired.

(1) As the clutch actuator can be housed in the hollow shaft, the constant-mesh type transmission which has a simple configuration and in which axial miniaturization is enabled can also be realized in a drive line in which a shaft itself is revolved.

(2) In the constant-mesh type transmission in which the clutch actuator is housed in the shaft, the clutch mechanism can be realized by a simple configuration. As plural clutch actuators are operated by one cam mechanism, each clutch actuator can be simply and precisely synchronized and as a result, satisfactory shift feeling is acquired.

(3) As the pin member of the clutch mechanism can be lifted from the cam groove to the cam crest respectively formed on the surface of the clutch actuator by a small force and smoothly, shift is also enabled in a state in which pedal effort is applied.

(4) In the case when the shift mechanism cannot follow the shift operation, the shift operation is held in the lost motion spring or the return spring as an elastic force and afterward, as the shift mechanism executes shift by the elastic force, secure shift is enabled even if a shift operation is swiftly made, shift operation is made a plurality of times or shift operation is made in a low-speed operation. Therefore, a condition related to shift timing is relaxed and a degree of freedom of the shift is high is enabled.

(5) In case the roller one-way structure is adopted as the clutch mechanism, shock and a lash at the pedal when speed is changed, inputting pedal effort can be greatly reduced, compared with the case when the ratchet one-way structure is adopted as the clutch mechanism.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission for a vehicle with plural transmission shafts including first and second hollow shafts and a third shaft located therebetween, wherein each hollow shaft supports plural transmission gears in a row that are arranged in parallel so that mutually corresponding transmission gears are engaged and a desired speed reducing ratio is acquired by selectively switching transmission gears revolving in synchronization with the hollow shaft of every transmission shaft, comprising:

a clutch mechanism provided between the first and second hollow shafts and the transmission gear for synchronizing the first and second hollow shafts and each transmission gear or releasing the synchronization; and a clutch actuator housed in the hollow shafts;

said clutch mechanism selectively synchronizes each transmission gear with the hollow shafts or releases the synchronization according to the axial position of the clutch actuator, said plural transmission shafts are independently arranged relative to each other and are positioned on distinct axes, wherein power input to said first hollow shaft is transferred to said second hollow shaft via said third shaft.

2. The transmission for a vehicle according to claim 1, and further including actuator driving means for axially driving the clutch actuator in response to shift operation.

3. The transmission for a vehicle according to claim 2, wherein the clutch mechanism further comprises:

a pin member housed in an opening radially piercing the side wall of the hollow shaft, said pin member being vertically movable; and a fitting member for fitting or releasing each transmission gear to the hollow shaft, said fitting member being interlocked with the vertical motion of the pin member, wherein the clutch actuator is in the shape of a rod and is provided with an irregular cam part arranged according to a predetermined rule on an outside face and the pin member is selectively movable vertically by moving the clutch actuator in the hollow shaft and fitting the cam part to the bottom of the pin member.

4. The transmission for a vehicle according to claim 2, wherein:

the actuator driving means includes a rotor turned in response to the shift operation and a corresponding rotational shaft;

the rotor is provided with a control face axially displaced according to a turning angle;

the clutch actuator is provided with a guide fitted to the control face; and the clutch actuator is axially driven in response to the amount of displacement when the control face is displaced according to the rotation of the rotor.

5. The transmission for a vehicle according to claim 4, further comprising:
   a cable hanger turned in response to the displacement of a shift cable wherein the shift operation is transmitted and supported coaxially with the rotational shaft of the rotor and allowing relative rotation to the rotor; and
   a lost motion spring coupled between the cable hanger and the rotor.

6. The transmission for a vehicle according to claim 3, wherein:
   the cam part is provided with an inclined face circumferentially continuing from a cam groove to a cam crest.

7. The transmission for a vehicle according to claim 3, wherein:
   the clutch mechanism includes a ratchet one-way structure.

8. The transmission for a vehicle according to claim 3, wherein:
   the clutch mechanism includes a roller one-way structure.

9. The transmission for a vehicle according to claim 8, wherein the roller one-way structure further comprises:
   a cylinder; and
   an elastic body that elastically presses the cylinder from a fitting released position to a fitted position,
   wherein the cylinder is provided with an annular groove on its circumference in the center and the lifted pin member is fitted to the annular groove and moves the cylinder from the fitted position to the fitting released position.

10. The transmission for a vehicle according to claim 9, wherein:
    the elastic body includes a plane part acquired by fitting respective one principal planes of a pair of L-springs and legs which are respective other principal planes of a pair of L-springs and support the plane part by respective one ends and respective other ends.

11. The A transmission for a vehicle with plural transmission shafts including first and second hollow shafts and a third shaft wherein each hollow shaft supports plural transmission gears in a row that are arranged in parallel so that mutually corresponding transmission gears are engaged and a desired speed reducing ratio is acquired by selectively switching transmission gears revolving in synchronization with the hollow shaft of every transmission shaft, comprising:
    a clutch mechanism provided between the first and second hollow shafts and the transmission gear for synchronizing the first and second hollow shafts and each transmission sear or releasing the synchronization; and
    a clutch actuator housed in the hollow shafts, wherein:
       said clutch mechanism selectively synchronizes each transmission gear with the hollow shafts or releases the synchronization according to the axial position of the clutch actuator, said plural transmission shafts are independently arranged relative to each other and are positioned on distinct axes, and power input to the first hollow shaft is transmitted to the second hollow shaft via the third shaft;
       in the first and second hollow shafts, each transmission gear is supported via the clutch mechanism; and
       in the third shaft, each transmission gear is fixedly supported.

12. The transmission for a vehicle according to claim 11, wherein:
    the first and second hollow shafts are respectively provided with the clutch actuator; and
    each clutch actuator is driven by common actuator driving means.

13. The transmission for a vehicle according to claim 2, wherein:
    in the first and second hollow shafts, each transmission gear is supported via the clutch mechanism; and
    in the third shaft, each transmission gear is fixedly supported.

14. The transmission for a vehicle according to claim 3, wherein:
    in the first and second hollow shafts, each transmission gear is supported via the clutch mechanism; and
    in third shaft, each transmission gear is fixedly supported.

15. The transmission for a vehicle according to claim 4, wherein:
    in the first and second hollow shafts, each transmission gear is supported via the clutch mechanism; and
    in the third shaft, each transmission gear is fixedly supported.

16. The transmission far a vehicle according to claim 5, wherein:
    in the first and second hollow shafts, each transmission gear is supported via the clutch mechanism; and
    in the third shaft, each transmission gear is fixedly supported.

17. The transmission for a vehicle according to claim 6, wherein:
    in the first and second hollow shafts, each transmission gear is supported via the clutch mechanism; and
    in the third shaft, each transmission gear is fixedly supported.

18. The transmission for a vehicle according to claim 7, wherein:
    in the first and second hollow shafts, each transmission gear is supported via the clutch mechanism; and
    in the third shaft, each transmission gear is fixedly supported.

19. The transmission for a vehicle according to claim 8, wherein:
    in the first and second hollow shafts, each transmission gear is supported via the clutch mechanism; and
    in the third shaft, each transmission gear is fixedly supported.

20. The transmission for a vehicle according to claim 9, wherein:
    in the first and second hollow shafts, each transmission gear is supported via the clutch mechanism; and
    in the third shaft, each transmission gear is fixedly supported.

* * * * *